United States Patent [19]
Moore

[11] Patent Number: 5,675,398
[45] Date of Patent: Oct. 7, 1997

[54] SPORTS TRAINING EYEGLASSES HAVING ADJUSTABLE LENSES AND METHOD FOR TRAINING THEREWITH

[76] Inventor: Gregory S. Moore, P.O. Box 75184, Charleston, W. Va. 25375

[21] Appl. No.: 493,369

[22] Filed: Jun. 21, 1995

[51] Int. Cl.⁶ .................... G02C 7/16; G02C 7/00
[52] U.S. Cl. .................... 351/45; 351/46; 351/53
[58] Field of Search .................... 351/41, 44, 45, 351/46, 53

[56] References Cited

U.S. PATENT DOCUMENTS

| | | |
|---|---|---|
| 1,335,921 | 4/1920 | Ramsay . |
| 1,637,406 | 8/1927 | Brumder . |
| 2,045,399 | 6/1936 | McMurdo . |
| 2,475,522 | 7/1949 | Scherkenbach ............... 351/45 |
| 2,663,021 | 12/1953 | Douglass ...................... 351/46 |
| 3,555,563 | 1/1971 | Grossman . |
| 4,531,743 | 7/1985 | Lott . |
| 4,898,459 | 2/1990 | Eriksson ...................... 351/46 |

*Primary Examiner*—Hung X. Dang
*Attorney, Agent, or Firm*—Spencer D. Conard

[57] ABSTRACT

A pair of eyeglasses is provided for sports training, and more specifically for training the player to keep the player's eyes on an approaching ball for batting or for swinging a racket. The pair of glasses, have a position adjustable pair of lenses each having an opaque peripheral region and a transparent central region. Initial adjustment of the lenses is achieved utilizing a removable cover element overlaying the transparent central region wherein the cover element has a viewing aperture. A method is provided wherein the player wears a pair of the glasses, adjusts the positions of the lenses to correspond to the positions of the pupillary disks of the player until the player can view a single focal element through each aperture, removing the cover elements from the lenses, and batting at a moving ball while wearing the eyeglasses.

18 Claims, 7 Drawing Sheets

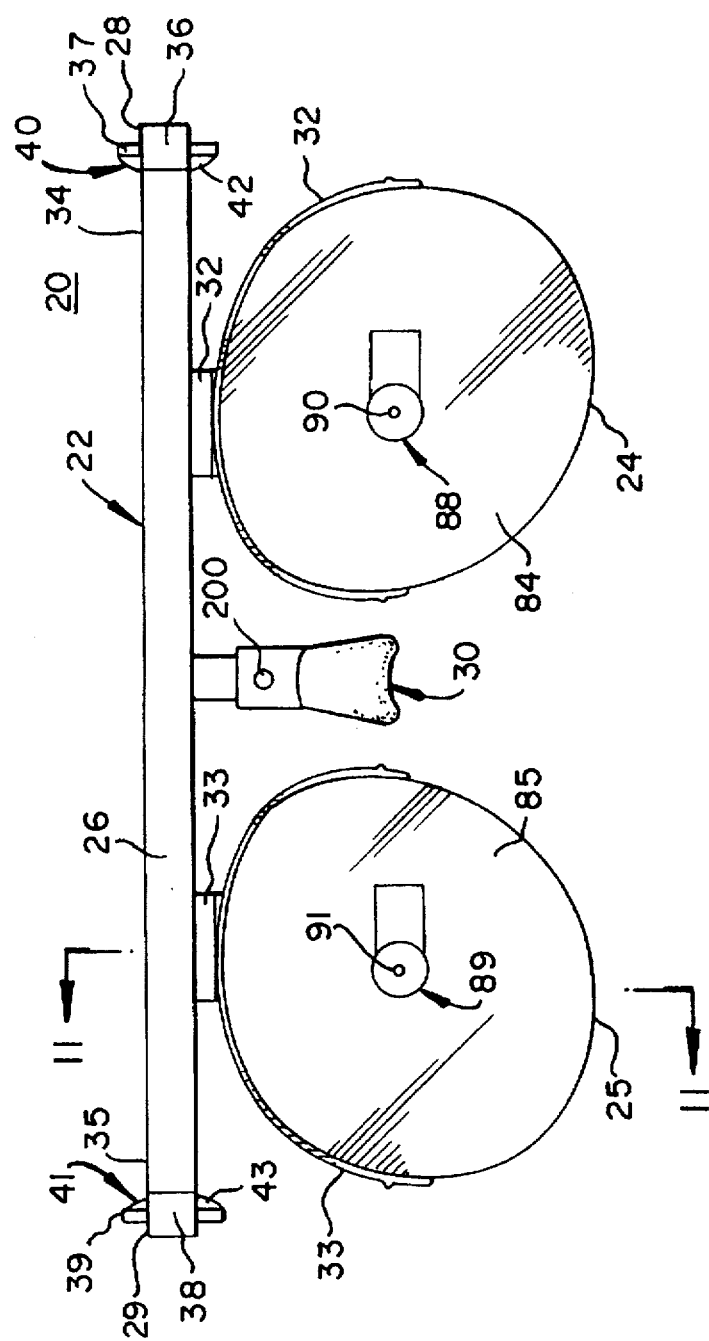

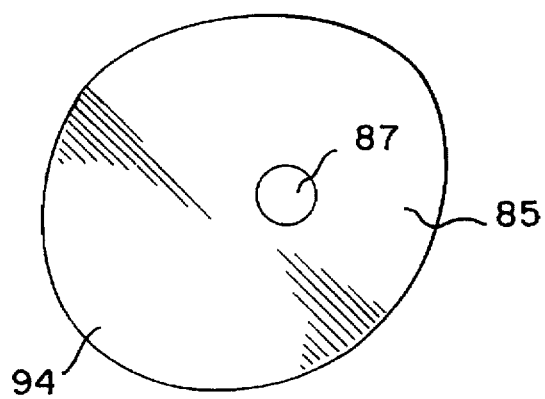
FIG. 6
FIG. 8
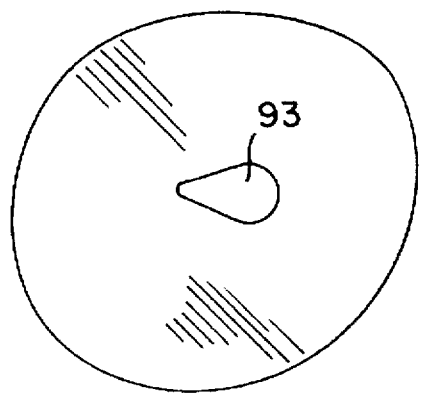 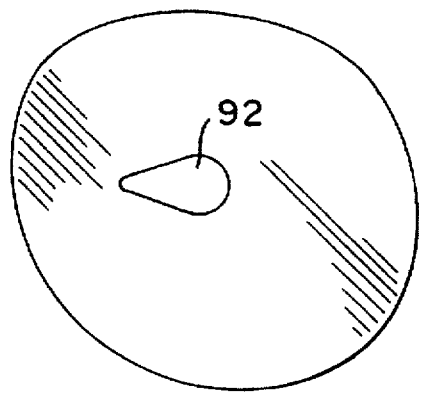
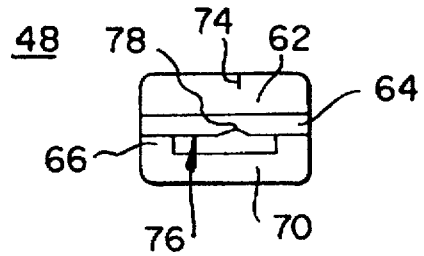 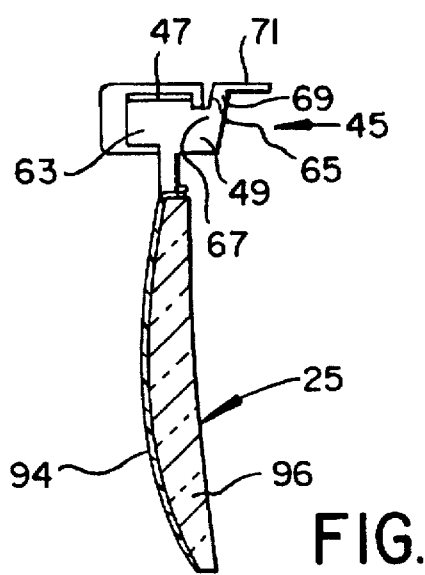
FIG. 10
FIG. 11

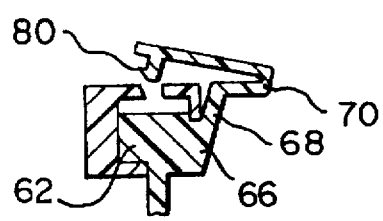
FIG. 12
FIG. 13
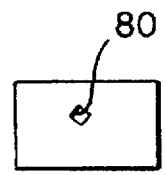
FIG. 7
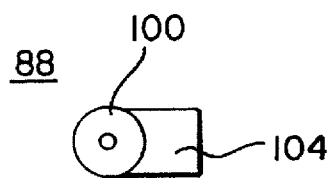
FIG. 9
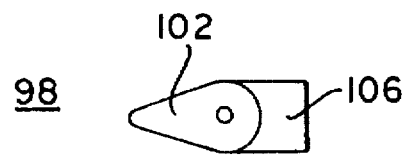
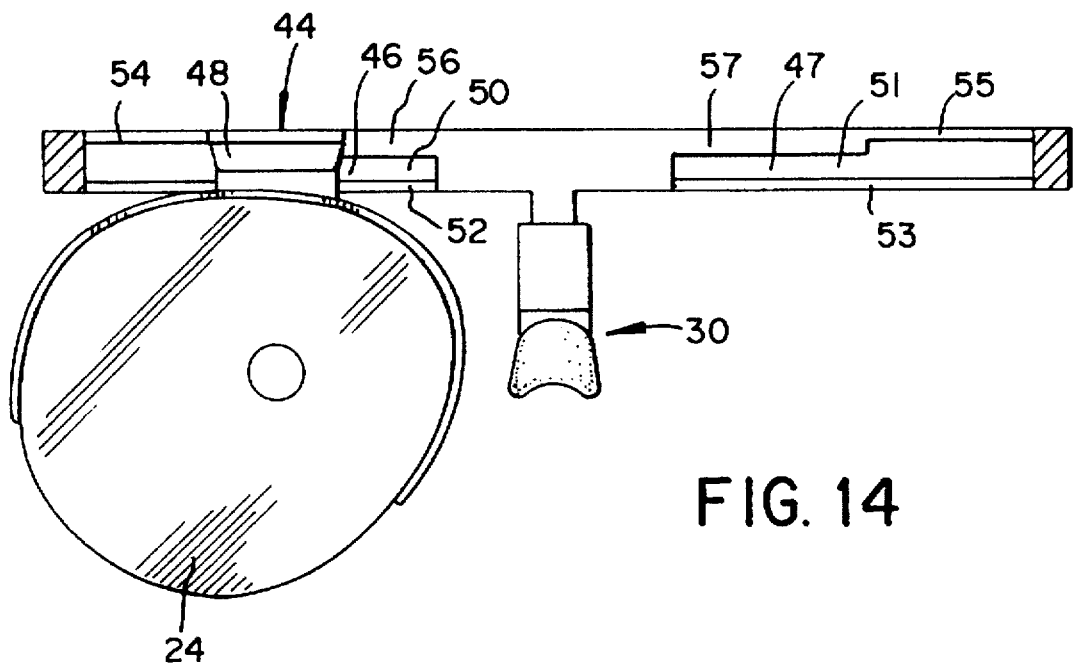
FIG. 14

5,675,398

1

SPORTS TRAINING EYEGLASSES HAVING ADJUSTABLE LENSES AND METHOD FOR TRAINING THEREWITH

BACKGROUND OF THE INVENTION

1. Field of the Invention

The present invention relates to sports training eyeglasses and methods related thereto, and more particularly relates to sports training eyeglasses having lenses with opaque peripheral regions and methods for sports training using such eyeglasses.

2. Description of the Related Art

Optical instruments for playing the game of golf or like ball games are known, see Ramsay, U.S. Pat. No. 1,135,921, issued Apr. 13, 1915, which discloses opaque blinkers each having a relatively small hole or transparent area. The optical instrument is designed to compel the player to "keep his eye on the ball". The holes or areas can be adjusted to suit the different widths apart of the eyes of different users by turning the disk around and by having the holes position in eccentric fashion. The optical instrument of Ramsay is less than ideal for sports involving a moving ball due to the same hole being used for adjustment and for game play. A small hole for proper adjustment would not provide a sufficient view for maintaining eye contact with a moving ball, especially a rapidly approaching ball. Consequently, there is a need and desire for a pair of eyeglasses, and associated method, which provides for accurate adjustment of the positions of the lenses to correspond to the pupillary positions of the wearer, and which provides for the ability to adequately track the movement of an approaching ball.

SUMMARY OF THE INVENTION

A pair of eyeglasses is provided comprising (a) a frame comprising, (i) an elongated bridge bar having opposite ends, (ii) a pair of opposing temporal side members extending from respective ends of the bridge bar, (iii) a nose piece depending from a central region of the bar, (iv) a pair of opposing lens retaining members depending from outer regions of the bridge bar, the nose piece being positioned between the lens retaining members, (b) a pair of lenses, each lens comprising (i) an opaque peripheral region, (ii) a transparent central region, (iii) a removable cover element overlaying the transparent central region, the cover element having a viewing aperture, the frame having adjustment means for adjusting the position of the lenses relative to the nose piece. The eyeglasses provide for separate (a) adjustment of the positions of the lenses by using the aperture of the cover element and (b) viewing of a moving ball through the central region once the cover element is removed. A method for training a batter (or racquet game player) is provided, wherein the method comprises (a) wearing a pair of eyeglasses as set out above, (b) adjusting the position of the lenses to correspond to the positions of the pupillary disks of the player until the player can view a single focal element through each aperture, (c) removing the cover elements from the lenses, (d) batting (or swinging a racquet at a moving ball while wearing the eyeglasses.

BRIEF DESCRIPTION OF THE DRAWINGS

FIG. 3 is a front elevational view of the pair of eyeglasses of FIG. 1 with the lenses and lens retaining member in place.

FIG. 4 is a side elevational view of the pair of eyeglasses of FIG. 1 with the lenses and lens retaining members removed.

2

Figure 5:
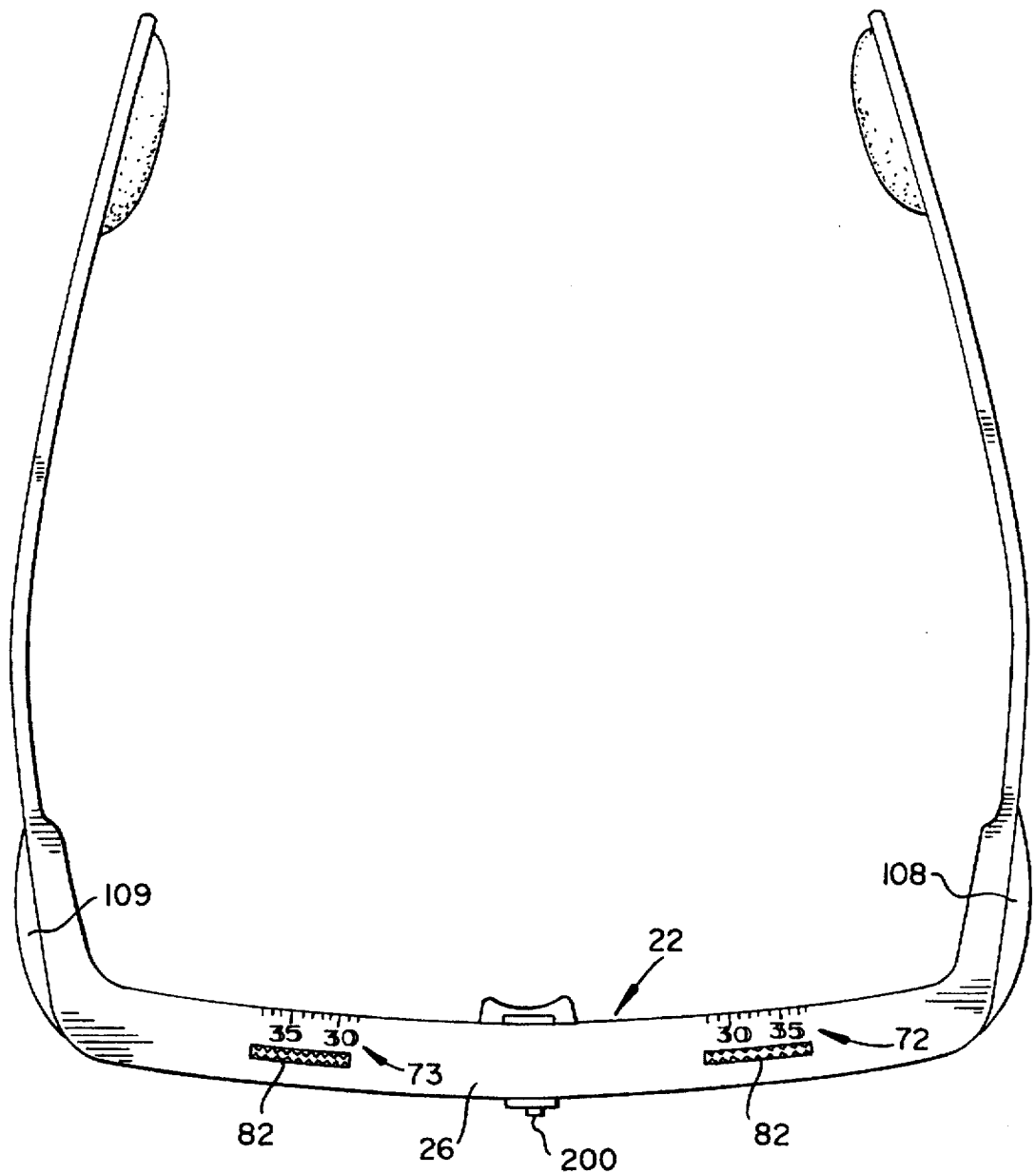

FIG. 5 is a top plan view of an alternative embodiment of the pair of eyeglasses having locking members but with the lenses and lens retaining members removed.

FIG. 6 is a front elevational view of a lens according to the present invention having a circular transparent central region.

FIG. 7 is a front elevational view of a cover element for the lens of FIG. 6.

FIG. 8 is a front elevational view of an alternative embodiment of a pair of lenses according to the present invention having horizontal tear shaped transparent central regions.

FIG. 9 is a front elevational view of a cover element suitable for the lenses of FIG. 8.

FIG. 10 is a cutaway top elevation view of a rider according to the present invention.

FIG. 11 is a vertical cross-sectional view of the pair of eyeglasses.

FIG. 12 is a vertical cross-sectional view of an alternative embodiment of a rider having a locking element.

FIG. 13 is a bottom plan view of the locking element.

FIG. 14 is a rear elevational view of a pair of eyeglasses according to the present invention with the right lens and right lens retain or member removed and the temporal side member cutaway.

Figure 15:
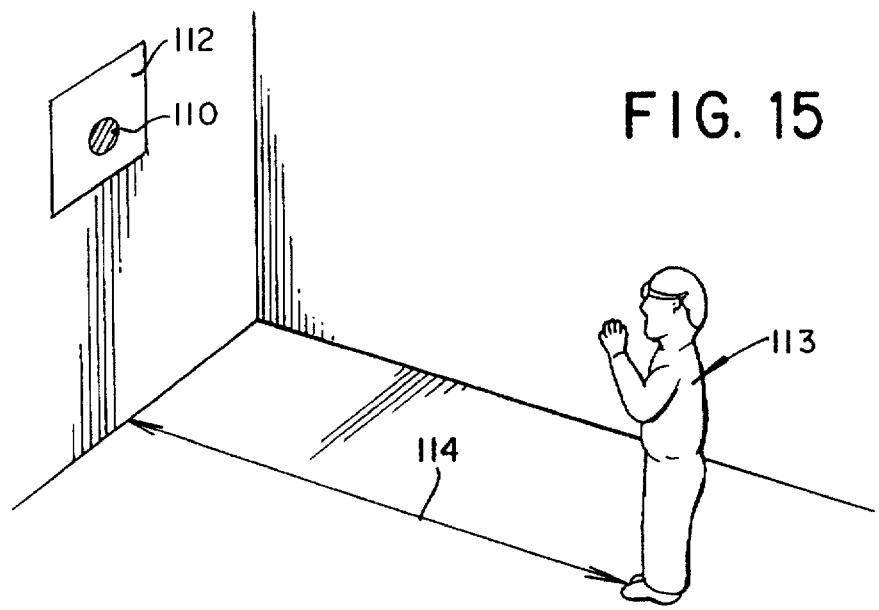

FIG. 15 is a perspective view of a wearer adjusting the position of the lenses to correspond to the pupillary distance of the wear and permit focus on a focal point.

Figure 16:
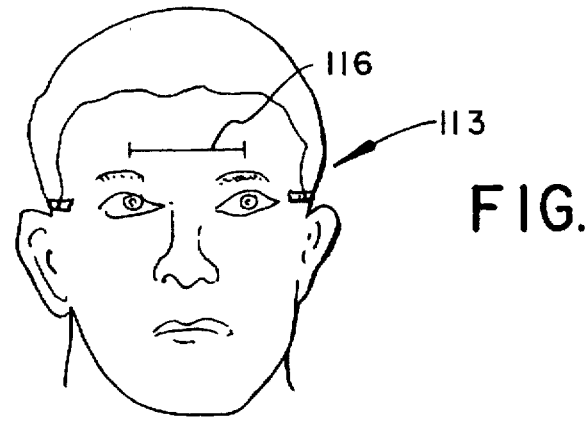

FIG. 16 is a front elevational view of a wearer head with the front of the eyeglasses cut away.

Figure 17:
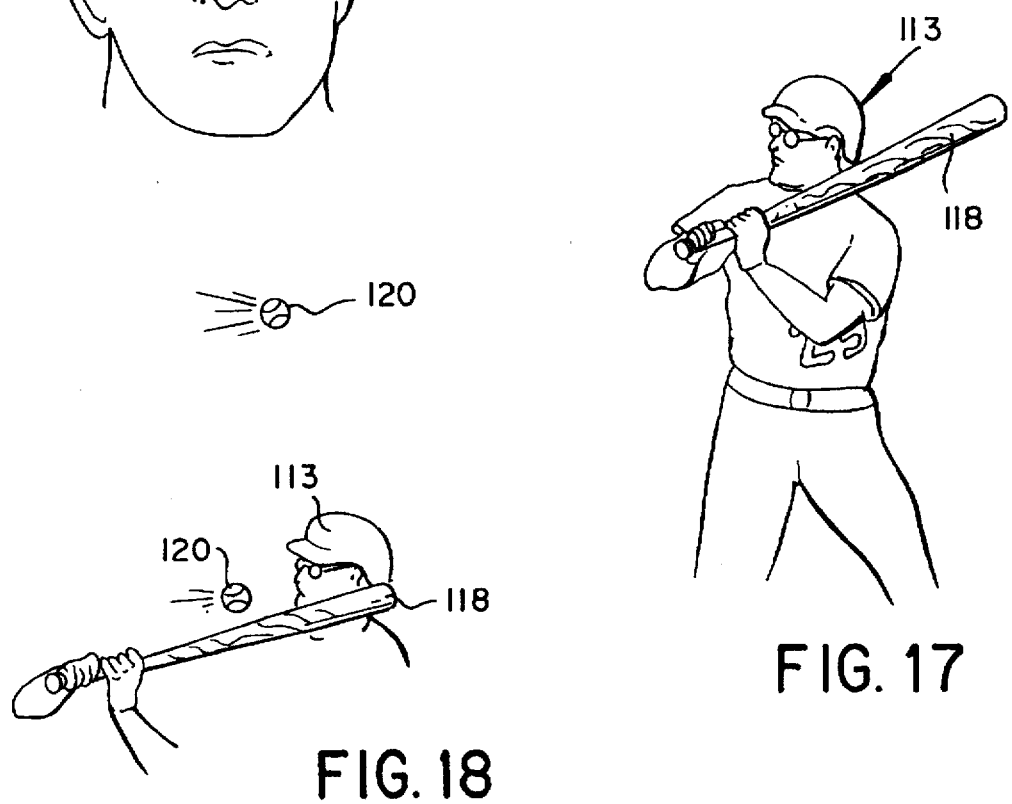

FIG. 17 is a side elevational view of a wearer awaiting an oncoming moving ball for batting thereof.

Figure 18:
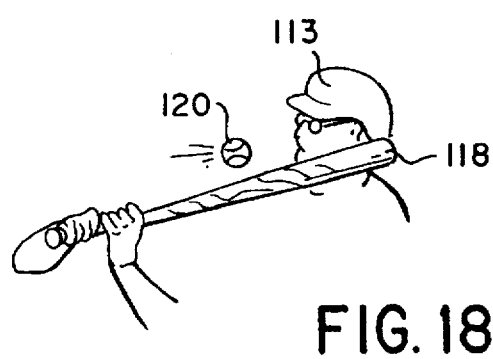

FIG. 18 is a wearer with the body not shown keeping a eye on the ball during contact of the bat with the ball.

DETAILED DESCRIPTION OF THE INVENTION

As shown in FIG. 3, a pair of eyeglasses (20) is provided comprising a frame (22) (see also FIGS. 1, 2 and 4) and a pair of lenses (24, 25) (left lens 24, right lens 25 based on the left and right hands of the wearer). The frame (22) comprises (a) an elongated bridge bar (26), (b) a pair of opposing temporal side members (28, 29) (left 28, right 29), and (c) a nose piece (30) and (d) a pair of opposing lens retaining member (32, 33) (left 32, right 33).

Figure 1:
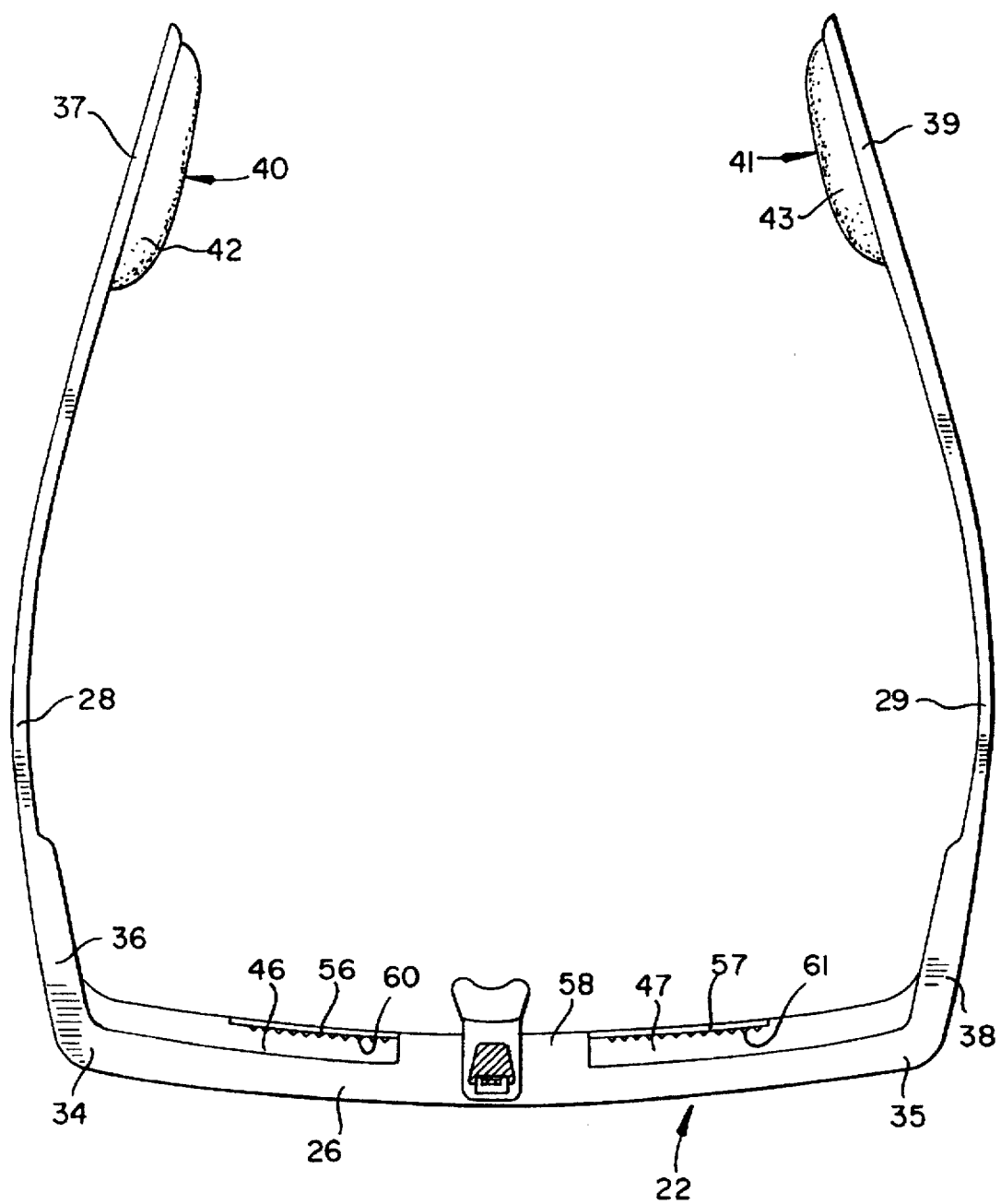
FIG. 1 is a bottom plan view of the pair of eyeglasses.
Figure 2:
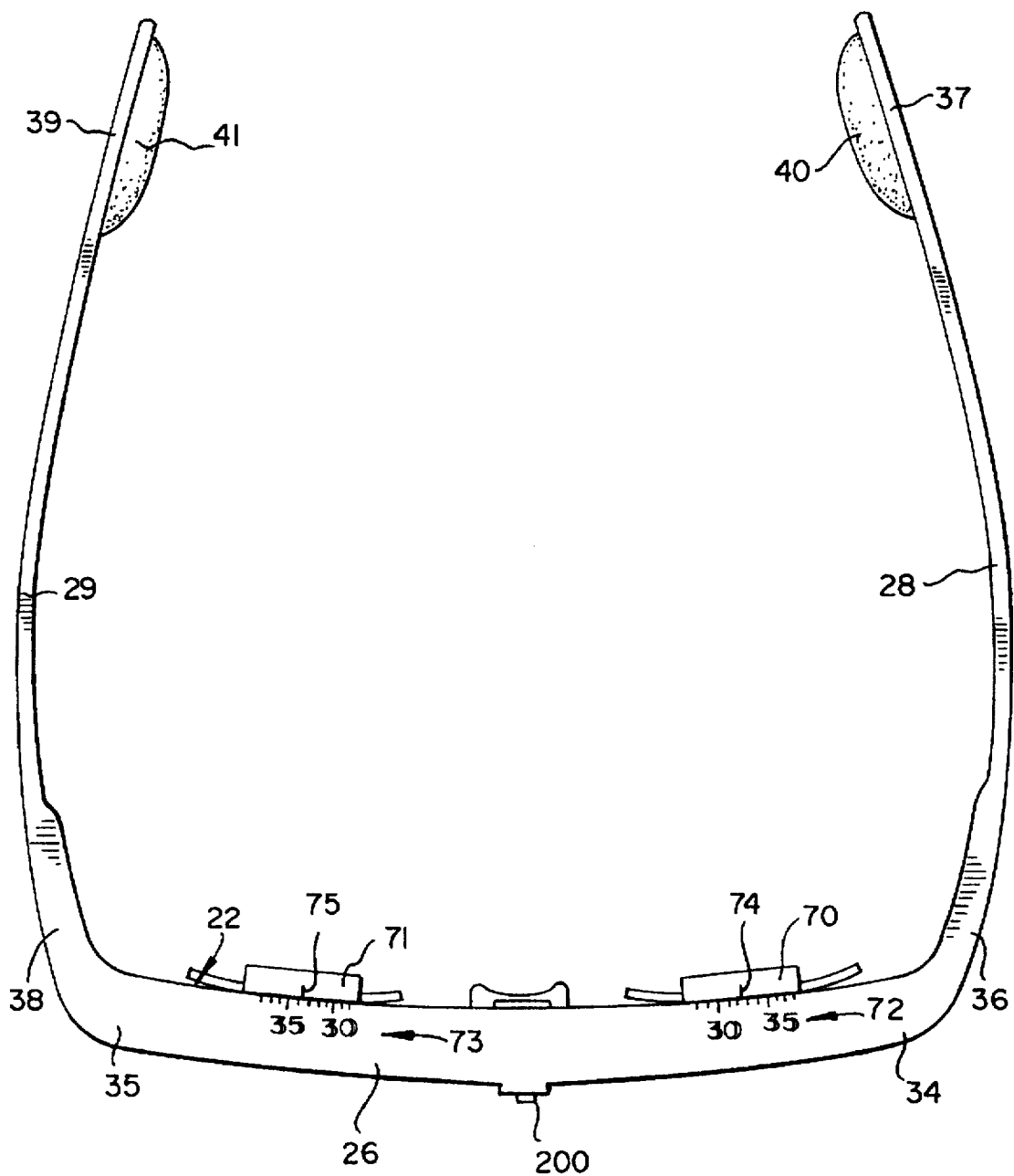
FIG. 2 is a top plan view of the pair of eyeglasses of FIG. 1.

The bridge bar (26) has a pair of horizontally opposite ends (34, 35), namely a left end (34) and a right end (35). As depicted in FIGS. 1-4, the left temporal side member (28) is attached at its forward end (36) to the left most end (34) of bridge bar (26) and may be integral therewith if the temporal side member (28) is flexible (plastic) or may be pivotally attached thereto via a hinge (not shown) for movement within a horizontal plan, and in like fashion, the right temporal side member (29) is attached at its forward end (38) to the right most end (35) of bridge bar (26) and may be integral therewith if the temporal side member (28) is flexible (plastic) or may be pivotally attached thereto via a hinge (not shown) for movement within a horizontal plane. The rear most ends (37, 39) of the temporal side members (28, 29, respectively) have head engaging portions (40, 41, respectively) for engaging the head of the wearer adjacent the ears of the wearer. As shown in FIGS. 1-3, the portions (40, 41) comprise an inwardly extending riser (42, 43, respectively) or may alternatively use a conventional ear hook (not shown). The frame may be made of an impact resistant plastic (such as rubber modified resins and aromatic polycarbonate resins) or may be made of metal.

The pair of opposing lens retaining members (32, 33) depending from outer regions of the bridge bar (26). The nose piece (30) is positioned between the retaining members (32, 33) and depends from the frame (22). As shown in FIGS. 11 and 14, the frame (22) has adjustment means (44, 45) for adjusting the position of the lenses (24, 25) relative to the nose piece (30). The adjustment means (44, 45) preferably each comprise a toothed frame channel (46, 47) and a channel rider (48, 49). The channels (46, 47) have a front wall (50, 51) which forms the front end of the channels (46, 47), a rearwardly extending bottom ledge (52, 53) which extends rearwardly from the front wall (50, 51) and a top wall (54, 55) which extends rearwardly from the front wall (50, 51). The bottom ledge (52, 53) extends rearwardly only a fraction of the distance that the top wall (54, 55) extends rearwardly from the front wall. Examples of suitable distances of extension include 1 to 2 millimeters for the bottom ledge (52, 53) and 4 to 7 millimeters for the top wall (54, 55). A toothed rail (56, 57) depends from the rearward most end of each top wall (54, 55) and extends outwardly from a central region (58) of the bridge bar (26) to a position between the center region (58) and the respective bridge bar end (34, 35). Each rail (56, 57) has a plurality of teeth (a row of teeth) (60, 61) which extends forwardly toward the front wall (50, 51). Each row of teeth preferably contains at least 10 teeth, and preferably between 20 and 60 teeth, for permitting fine adjustment of lens positions along the bridge bar (26). Each channel (46, 47) has a corresponding channel rider (48, 49) which connected to a respective lens (24, 25). The channel (46, 47) initially receives the rider (48, 49) at the outer portion of the channel. The rider (48, 49) has a front most abutment (62, 63) which extends forwardly into a position between the ledge (52, 53) and the top wall (54, 55) for vertical confinement therebetween. The rider (48, 49) has a groove (64, 65) which receives the respective rail (56, 57). The groove (64, 65) is formed at its forward end by the rear of the abutment (62, 63), and its bottom is formed by the top of a rearward extension element (66, 67) and its rearward end is formed by a rear wall (68, 69) extending upwardly from the rear of the extension element (66, 67). A rectangular plate (70, 71) extends rearwardly from the top of the rear wall (68, 69). The rear wall (68, 69) extends higher than the top of the abutment (62, 63). When the rider (48, 49) slides into the channel (46, 47), the groove (64, 65) receives the rail (56, 57) which restricts the rearward motion of the abutment (62, 63). The forward motion of the rail (56, 57) is restricted by the front wall (50, 51). The top of the plate (70, 71) is preferably at the same height as the top of the bridge bar (22). Suitable numeric indicia (72, 73) may be on the bridge bar (22), and an indexing mark (74, 75) may be on the top of the plate (70, 71) to indicate the distance of the center of the respective lens (24, 25) from the nose piece (30). The rear most end of the abutment (62, 63) has a rearwardly based single toothed spring (76) for selectively positioning the rider within the channel (46, 47) in one of a plurality of positions corresponding to the tooth (78) of the spring (76) being retained between two adjacent teeth of the row of teeth (60, 61) of the rail (56, 57). As best shown in FIG. 12, the plate (70, 71) may have attached thereto a means for locking the position of lenses (24, 25) against movement within the channel (46, 47) so that once a suitable lens position is achieved, the lens (24, 25) will not be unintentionally moved from the desired position. Suitable locking means include a square shaped (or diamond shaped) pin (80) on a finger which is received within a corrugated slot (82), see FIG. 5.

As shown in FIGS. 3, 4, 6 and 8, each lens (24, 25) has an opaque peripheral region (84, 85) and a transparent central region (86, 87). A cover element (88, 89) overlaps each transparent central region (86, 87) and is removably adhered thereto preferably with a very weak adhesive. Each cover element (88, 89) has a viewing aperture (90, 91) which is preferably circular in shape and are preferably less than 10% of the area of the total area of the transparent central region (86, 87), and more preferably less than 2% thereof. Preferably the aperture (90, 91) has a diameter of between 0.5 millimeters and 3 millimeters, more preferably between 0.7 and 2 millimeters, and most preferably between 0.8 and 1.5 millimeters. The transparent central region (86, 87) (especially if it is circular in shape) preferably has a total area of between 40 square millimeters and 120 square millimeters, more preferably between 50 and 80 square millimeters, and most preferably between 60 and 70 square millimeters and preferably has a diameter of between 7 millimeters and 12 millimeters, more preferably between 8 and 10 millimeters, and most preferably 9 millimeters. If a horizontal tear shaped transparent central region (92, 93) is employed then the width of the central region is preferably between 10 millimeters and 18 millimeters, more preferably between 12 and 15 millimeters, and most preferably between 13 and 14 millimeters, and the area of the central region is preferably between 60 and 180 square millimeters, more preferably between 70 and 120 square millimeters, and most preferably between 90 and 100 square millimeters.

As best shown in FIGS. 4, 6 and 8, the lenses are preferably a conventional lens shape, and as best shown in FIG. 11, an opaque plastic film layer adhered to the body (96) of the lens (24, 25) provides the lens (24, 25) with the opaque peripheral region (84, 85). The film (94) has a central cut out which provides the lens with the transparent central region (86, 87, 92, 93).

The cover elements (88, 98) as shown in FIGS. 7 and 9 have an overlay portion (100, 102) and a tab portion (104, 106). The overlay portion (100) of the cover element (88) of FIG. 7 is circular effectively cover the circular central region (86, 87) of the lens (24, 25). The overlay portion (102) of the cover element (98) of FIG. 9 is tear shaped to effectively cover the tear shaped central region (92, 93) of the lens of FIG. 8. The overlay portion is releasably adhered to central region for manipulative removal therefrom. The cover elements preferably have a tab portion extending from the overlay portion for manipulative access to the element for peeling removal of the element from the lens.

The clear body of each lens is preferably made of a conventional lens material such as an impact resistant aromatic polycarbonate resin such as bisphenol A polycarbonate resin.

Each lens (24, 25) is attached at its top to and depends from respective posts of the rider which extend downwardly from the bottom rear of the abutment. The opaque (preferably black) resin film layer is preferably made of a polyolefin film such as a polyethylene film having an adhesive backing for permanently adhering to the polycarbonate resin lens base.

The frame (22) preferably has a pair of opaque blinders (108, 109) (see FIG. 5) dependent from the front sections (36, 38) of respective temporal side members (28, 29) for further restricting the peripheral view of the wearer.

The present invention further involves a method for training sports players to keep their eyes on the ball, and this training method is especially suited for ball sports involving ball motion and player swinging contact of the moving ball. Such games include, for example, baseball, softball, and tennis. The method involves having the player (batter) (a) wear (wearing) a pair of the above eyeglasses (20), (b) adjust (adjusting) the position of the lenses (24, 25) to correspond to the positions of the pupillary disks of the player until the player can view a single focal element (110) through each aperture, (c) removal (removing) of the cover elements (88, 89) from the lenses (24, 25), (d) swing (swinging, batting) at a moving ball while wearing the eyeglasses. Preferably the focal element comprises a poster having a focal point indicia thereon wherein the indicia is preferably in the shape of a filled circle having a diameter of between 1 centimeter to 10 centimeters. Preferably the adjusting is done with the poster (112) being positioned from 6 to 20 feet from the wearer (113) (batter) as illustrated by measurement line (114). The lenses are preferably adjustable through a range of 52 millimeters to 78 millimeters distance between the apertures of the cover elements for permitting the eye glasses to be adjusted to the pupillary distance (see FIG. 16, measurement indicator 116) of the wearer of the eyeglasses.

FIGS. 10, 11 and 12 best show the configuration of the channel and rider serve as means for adjusting the positions of the lenses relative to each other and relative to the nose piece. As shown in FIGS. 12 and 5, the frame and rider may have cooperative structures for locking the rider (and thus the lenses) against movement relative to the frame after adjustment. As depicted in the alternative embodiment of FIGS. 12 and 5, the frame can have a locking slot filled with rows (82) of opposing teeth which receive a locking post (80) (see FIG. 13) having a square or diamond shaped cross section for fitting between adjacent pairs of teeth and for being locked therebetween to prevent unintentional horizontal movement of the rider (48, 49) within the channel (46, 47). Post (80) may have a hooked end (see FIG. 12) for more permanent positioning.

A circular cover element is shown in FIG. 7 and a horizontally oriented teardrop shaped cover element is shown in FIG. 9. The cover elements have operatives for the initial lens position adjustment step.

FIGS. 15, 16, 17 and 18 illustrate the above method utilizing a batter (113) holding a bat (118) and a ball (120).

The vertical position of the nose piece may be locked into position by peg (200). The clear transparent central regions (86, 87) are covered by the cover elements (88, 89) respectively in FIG. 3, and may be partially seen through respective aperture (90, 91) as viewed in FIG. 3.

I claim:

1. A pair of eyeglasses comprising
   a) a frame comprising
      (i) an elongated bridge bar having opposite ends,
      (ii) a pair of opposing temporal side members extending from respective ends of said bridge bar,
      (iii) a nose piece depending from a central region of said bar,
      (iv) a pair of opposing lens retaining members depending from outer regions of said bridge bar, said nose piece being positioned between said lens retaining members,
   (b) a pair of lenses, each lens comprising
      (i) an opaque peripheral region,
      (ii) a transparent central region,
      (iii) a removable cover element overlaying said transparent central region, said cover element having a viewing aperture, said frame having adjustment members for adjusting the positions of the lenses relative to the nose piece.

2. The pair of eyeglasses of claim 1, wherein said cover element comprises
   (a) an overlay portion releasably adhered to said central region, and
   (b) a tab portion extending from said overlay portion for manipulative access to said element for peeling removal of said element from said lens.

3. The pair of eyeglasses of claim 1 comprising a pair of said removable cover elements, wherein each of said elements covers a respective lens central region.

4. The pair of eyeglasses of claim 1 wherein said transparent central region is circular in shape.

5. The pair of eyeglasses of claim 4 wherein said aperture is circular in shape and has a diameter of between 0.5 millimeters and 3 millimeters.

6. The pair of eyeglasses of claim 5 wherein said circular transparent central region has a diameter of between 7 millimeters and 12 millimeters.

7. The pair of eyeglasses of claim 1 wherein said transparent central region is a horizontal teardrop shape.

8. The pair of eyeglasses of claim 7 wherein said teardrop shaped central region has a left most curved end on and a right most pointed end.

9. The pair of eyeglasses of claim 1 wherein said eyeglasses comprise means for locking the positions of the lenses.

10. The pair of eyeglasses of claim 1 wherein each lens has a cover element, said frame is adjustable throughout a range of from 52 millimeters to 78 millimeters distance between the apertures of the cover elements for permitting the eyeglasses to be adjusted to the pupillary distance of a wearer of the eyeglasses.

11. A method for training a batter, said method comprising:
   (a) wearing a pair of eyeglasses as claimed in claim 10,
   (b) adjusting the position of the lenses to correspond to the positions of the pupillary disks of the batter until the batter can view a single focal element through each aperture,
   (c) removing the cover elements from the lenses, and
   (d) batting at a moving ball while wearing the eyeglasses.

12. The pair of eyeglasses of claim 1 wherein said lenses are aromatic polycarbonate resin lenses.

13. The pair of eyeglasses of claim 12 wherein said lenses are bisphenol A polycarbonate resin lenses.

14. The pair of eyeglasses of claim 1 wherein aid pair of eyeglasses comprise a blinder dependent from a front section of temporal side member.

15. The method of claim 1 wherein said focal element comprises a poster having a focal point indicia thereon.

16. The method of claim 15 wherein said indicia is in the shape of a circle and has a diameter of between 1 centimeter to 10 centimeters.

17. The method of claim 16 wherein said poster is positioned from 6 to 20 feet from the batter for said adjusting.

18. A pair of eyeglasses comprising:
   (a) a pair of lenses,
   (b) a frame retaining said lenses, said frame having means for adjusting the positions of said lenses, each of said lenses comprising
      (i) an opaque peripheral region,
      (ii) a horizontal tear shaped transparent central region having an area of between 60 square millimeters and 180 square millimeters, and
   (c) a pair of removable horizontally oriented teardrop shaped cover elements, wherein each of said elements covers a respective lens central region.

* * * * *